United States Patent
Selig et al.

(10) Patent No.: US 7,380,475 B2
(45) Date of Patent: Jun. 3, 2008

(54) DYNAMOMETRIC CELL

(75) Inventors: Klaus Peter Selig, Balingen-Weilstetten (DE); Klaus Wurster, Pliezhausen (DE)

(73) Assignee: Bizerba GmbH & Co. KG, Balingen (DE)

( * ) Notice: Subject to any disclaimer, the term of this patent is extended or adjusted under 35 U.S.C. 154(b) by 67 days.

(21) Appl. No.: 11/229,355

(22) Filed: Sep. 19, 2005

(65) Prior Publication Data

US 2006/0053898 A1 Mar. 16, 2006

Related U.S. Application Data

(63) Continuation-in-part of application No. PCT/EP2004/002953, filed on Mar. 20, 2004.

(30) Foreign Application Priority Data

Mar. 21, 2003 (DE) ................ 103 13 828

(51) Int. Cl.
*G01L 1/00* (2006.01)
*G01B 7/14* (2006.01)
(52) U.S. Cl. .............. 73/862.621; 73/862.624; 73/862.626; 73/862.69
(58) Field of Classification Search ......... 73/862.625, 73/862.69, 862.68, 862.621, 862.24, 862.26
See application file for complete search history.

(56) References Cited

U.S. PATENT DOCUMENTS

| | | | |
|---|---|---|---|
| 3,695,096 A | 10/1972 | Kutsay | |
| 3,771,359 A * | 11/1973 | Shoberg | 73/862.044 |
| 4,393,951 A | 7/1983 | Horst-Rudolf | |
| 4,454,769 A | 6/1984 | Loos | |
| 4,478,091 A * | 10/1984 | Forrester | 73/862.541 |
| 4,911,024 A | 3/1990 | McMaster | |
| 4,982,613 A | 1/1991 | Becker | |
| 5,402,684 A | 4/1995 | Engeler et al. | |
| 5,777,239 A * | 7/1998 | Fuglewicz | 73/862.68 |
| 5,988,676 A | 11/1999 | Lotito et al. | |
| 6,865,961 B2 | 3/2005 | Wolf et al. | |
| 2003/0156920 A1 | 8/2003 | Dukart et al. | |
| 2004/0007397 A1 | 1/2004 | Golla | |
| 2004/0187608 A1* | 9/2004 | Kurtz et al. | 73/862.391 |
| 2004/0255687 A1 | 12/2004 | Dukart | |
| 2005/0103128 A1 | 5/2005 | Dukart | |

FOREIGN PATENT DOCUMENTS

| | | |
|---|---|---|
| DE | 35 15 126 A1 | 10/1986 |
| DE | 38 43 869 C2 | 6/1990 |
| DE | 44 20 691 C1 | 1/1996 |

(Continued)

*Primary Examiner*—Edward Lefkowitz
*Assistant Examiner*—Punam Patel
(74) *Attorney, Agent, or Firm*—Leydig, Voit & Mayer, Ltd.

(57) ABSTRACT

A dynamometric cell having an elastically deformable force transducer for receiving a weight force and a sensor arrangement for detecting the deformation of the force transducer and its conversion into an electric weight signal is disclosed, wherein the force transducer is connected to a mounting member at its first end and supports a force introduction member at its second end, such that it allows a more exact determination of weight force even when it is incorporated into narrow spaces and wherein the force transducer is designed as a hollow bar with two attenuation zones spaced in longitudinal direction of the bar.

33 Claims, 9 Drawing Sheets

FOREIGN PATENT DOCUMENTS

| | | |
|---|---|---|
| DE | 100 35 483 | 1/2002 |
| DE | 101 11 020 A1 | 9/2002 |
| EP | 0 594 534 | 4/1994 |
| EP | 1 376 078 | 1/2004 |
| WO | WO 02/08705 A1 | 1/2002 |
| WO | WO 03/060440 A1 | 7/2003 |
| WO | WO 2004/003501 | 1/2004 |
| WO | WO 2004/043746 | 5/2004 |
| WO | WO 2004/074787 | 9/2004 |

* cited by examiner

DYNAMOMETRIC CELL

CROSS-REFERENCE TO RELATED APPLICATIONS

This application is a continuation-in-part of International application No. PCT/EP2004/002953 filed on Mar. 20, 2004.

The present disclosure relates to the subject matter disclosed in International application No. PCT/EP2004/002953 of Mar. 20, 2004 and German application number 103 13 828.5 of Mar. 21, 2003, which are incorporated herein by reference in their entirety and for all purposes.

BACKGROUND OF THE INVENTION

The invention relates to a dynamometric cell with an elastically deformable force transducer for receiving a weight force and a sensor arrangement for detecting the deformation of the force transducer and its conversion into an electric weighing signal, wherein the force transducer is connected to a mounting member at a first end and supports a force introduction member at its second end.

Dynamometric cells of this type are used in a variety of ways and are known in different forms.

DE 44 206 91 C1, for example, describes a dynamometric cell with a force transducer in the form of a so-called parallelogram guide which is machined in one piece from a non-magnetic, electrically conductive material. The sensor arrangement comprises, in this case, an inductive sensor element which is arranged adjacent to the force introduction member of the force transducer opposite a signal-generating element on the side of the mounting member such that during stressing of the force introduction member with the force F an alteration in the distance between the sensor element and the signal-generating element, which is dependent on this force, results on account of the elastic deformation of the force transducer.

Such force transducers are often built into weighing devices and operate in this case with great reliability and high resolution.

Another type of force transducer is known, for example, from DE 35 15 126, with which the dynamometric cell comprises a flexurally elastic tubular bolt with a rigid measuring bar securely clamped in the cavity of the bolt on one side and a sensor inserted at the other end of the bolt. The free end of the measuring bar is located axially opposite the inductively operating sensor. The force is introduced between the end of the bolt and the clamping point of the rigid measuring bar. During flection of the bolt, the position of the free end of the measuring bar is altered in relation to the sensor and this alteration in location is detected by the sensors and converted into an electric signal. Such electromechanical dynamometers are well suited for the detection of large forces, wherein less value must be placed on precision. The dynamometric cell according to DE 38 43 869 C2 also operates by following a similar principle. This dynamometric cell is also suitable for detecting large forces with less precision.

All the aforementioned dynamometric cells have in common the fact that the force transducer is robust but of a relatively large construction and cannot, therefore, be used for a number of applications where a determination of a weight force would, as such, be desirable.

The object of the present invention is to further develop a dynamometric cell of the type described at the outset such that it can also be incorporated into narrow spaces and allows a more exact determination of weight force.

BRIEF SUMMARY OF THE INVENTION

This object is accomplished in accordance with the invention in that the force transducer is designed as a hollow bar with two attenuation zones spaced in longitudinal direction of the bar.

The dynamometric cell according to the invention thereby combines the advantages of the bolt solutions explained in the above, on the one hand, with the greater accuracy of the solution with the parallelogram guide, on the other hand. In addition, on account of the use of a hollow bar the sensor arrangement can be arranged in the interior thereof and so this can be protected and, in particular, screened from electromagnetic environmental influences. On account of the bar shape of the force transducer, this may easily be designed as a screw bolt which can then take over the same connector function as a substitute for conventional screw bolts but, at the same time, functions in addition as a fully adequate dynamometric cell.

The attenuation zones of the dynamometric cell according to the invention are preferably designed such that the force transducer can carry out elastic deformation movements in more than one plane when acted upon by weight forces to be determined. As a result, not only forces or rather force components which act on the force transducer in one direction can be detected but rather forces can be determined directionally or rather force components of a force acting on the force transducer can be detected and evaluated.

The attenuation zones will preferably comprise a section of the hollow bar with a reduced wall thickness. This may be realized particularly easily on the external circumference of the hollow bar or also on the inner wall of the hollow bar.

The attenuation zones may be designed so as to extend all the way around in circumferential direction of the hollow bar, wherein it is then ascertained by way of a suitable design of the sensor arrangement, in which directions components of a weight force can be determined, or, however, the attenuation zones can extend only partially and radially in circumferential direction of the hollow bar and be designed as circular segments located opposite one another so that the direction of the force components to be measured can already be ascertained on account of the attenuation zones.

The hollow bar may either be cylindrically tubular or, however, have any optional polygonal cross section.

In addition, oval cross sections of the hollow bar are also conceivable, whereby the respective specific requirements of the assembly situation and/or the respective application, for which the dynamometric cell is provided, can be taken into account.

In a preferred embodiment of the invention, the hollow bar has passages in the form of a transverse bore centrally in the area between the attenuation zones. The transverse bore, which passes through the wall of the hollow bar twice, considerably reduces the influence of torsion forces on the result of measurement.

One alternative consists in providing the hollow bar with passages, which extend at least from the one attenuation zone as far as the other one, in two segments of a hollow profile located radially opposite one another.

By creating the passages in the hollow profile, the mechanical stability is, of course, decreased which is manifested in a reduced maximum admissible weight force.

If the wall thickness of the hollow profile, from which the hollow bar is produced, is increased, the measurement area may be increased again and so no limitations need be accepted with respect to the maximum admissible weight force to be measured in comparison with the embodiments with a complete hollow profile as hollow bar.

The passages may extend in certain embodiments as far as the free end of the hollow bar which supports the force introduction member. The two parts of the hollow profile are, however, rigidly connected to one another again at this end, for example, by way of welding to the force introduction member.

This embodiment still differs from the conventional parallel guide dynamometric cells in that forces can be received from not only one direction and be processed to result in a measurement on account of the geometry of the (remaining) wall of the hollow bar.

This wall diverges in any case out of the plane whereas in the case of the parallel guide type plane walls are used.

In particularly preferred embodiments, the force introduction member is of a pot-shaped design and surrounds the force transducer with its open end. As a result, the force transducer is enclosed by the force introduction member and protected at the same time from mechanical influences. The same also applies for the sensor arrangement which is likewise surrounded and protected by the pot-shaped force introduction member.

For this purpose, the force introduction member is preferably dimensioned such that its pot walls extend essentially over the entire length of the force transducer, wherein the open end of the force introduction member is then arranged so as to be adjacent to the mounting member. This has the additional advantage that the planes, in which the force acts on the force introduction member, and the plane, in which the force is deflected to the surroundings via the mounting member, can be arranged relatively close to one another and so only slight distortional or rather torsion forces act on the force transducer. This simplifies the construction or rather the dimensioning of the parts of the dynamometric cell considerably since the importance to be attached to the torsion stressing is not too great.

The force introduction member is designed so as to be essentially free from any apertures so that it exercises a protection function, which can be an electromagnetic protection function in addition to the mechanical one, so that a complete protection of the parts of the dynamometric cell arranged in the interior of the force introduction member is ensured.

The force introduction member and the mounting member preferably have fixing sections which define a force introduction and a force deflection in adjacent, preferably essentially parallel planes. These planes are intended to be located as close to one another as possible, in accordance with the aspects specified above, so that the torsion forces which act on the dynamometric cell during the introduction of forces are as slight as possible.

In a preferred embodiment of the dynamometric cell, the force introduction member is of a hollow cylindrical design and connected at one end to the second end of the force transducer.

The hollow cylindrical force introduction member preferably has an external thread section at its end connected to the force transducer.

The hollow cylindrical force introduction member is preferably arranged such that it extends essentially over the entire length of the force transducer and encloses it as a result.

The other end of the hollow cylindrical force introduction member is preferably mounted on the mounting member so as to be movable.

For this purpose, an annular receiving means is preferably provided on the mounting member and this accommodates and mounts the other end of the force introduction member.

In addition, the force introduction member is preferably held on the mounting member by means of a stop which limits the movement of the force introduction member at the same time. In the case of overlarge forces, the force introduction member is secured, on the one hand, against being wrenched out of the receiving means of the mounting member and, in addition, an overload protection is created, in particular, for the force transducer.

In order to further develop the compact mode of construction in a consistent manner, a retaining element is preferably arranged on the mounting member coaxially to the hollow bar so that this extends into the hollow bar and can serve the purpose of holding a part of the sensor arrangement or also the entire sensor arrangement.

The retaining element preferably has a recess, in which electric signal cables of the sensor arrangement are guided. This results in a particularly simple and also space-saving possibility for the cabling and the signal connection of the sensor arrangement to an associated control. Furthermore, the dynamometric cell according to the invention preferably comprises an integrated, mechanical overload protection. The mechanical overload protection means that during any action of an excessively large, i.e., no longer admissible force, the force introduction member is supported on a stop so that the maximum deformation of the force transducer is limited and, therefore, any mechanical damage due to overload is ruled out.

Depending on the design of the dynamometric cell, also dependent again on the assembly situation thereof, the stop can be formed on the retaining element itself and limit a deformation movement of the force transducer itself.

On the other hand, the stop may be formed on the mounting member and on the force introduction member so that the deformation movement of the force transducer is limited indirectly.

In a further variation, it may be provided for the stop to be formed on the force introduction member and on the force transducer and thus to lead to a mechanical limitation of the elastic deformation of the force transducer.

In addition, the retaining element comprises a recess, in which a sensor element can be arranged and accommodated. Furthermore, the recess preferably comprises a guide for determining the geometric alignment of the sensor element in the dynamometric cell.

The sensor arrangement may be selected from various, known sensor arrangements and comprise, for example, one or more wire strain gauges.

Alternatively, the sensor arrangement can be designed for a contact-free distance measurement. In a special embodiment, the sensor arrangement is a sensor arrangement operating inductively. In the case of dynamometric cells which are spatially very compact, a sensor arrangement with a Hall sensor and a magnet, in particular, a permanent magnet is particularly recommended.

With this embodiment, the magnet may be arranged on the force introduction member and the Hall sensor on the retaining element. A reverse arrangement, i.e., the arrangement of the magnet on the retaining element and the arrangement of the Hall sensor on the force introduction member is likewise possible. The first configuration does, however, have the advantage that the signal lines of the sensor can be guided in the retaining element and are, therefore, arranged in a very space-saving and, at the same time, protected manner.

The Hall sensor and the magnet of the sensor arrangement are preferably designed and arranged such that in the no-load state of the dynamometric cell the Hall sensor generates an electric signal with a value smaller than a third of the maximum effective signal.

This ensures that an adequate reserve for the amplification of the effective signal is provided for the evaluation circuit and an adequate signal-to-noise ratio is present.

In a first variation, the magnet can be designed to act as a monopole in relation to the Hall sensor, wherein the Hall sensor comprises an even number of sensor elements which are arranged in the form of a two-dimensional matrix located opposite the monopole, wherein two of the sensor elements form each time a part of an electronic differential circuit.

Alternatively, the magnet can be designed to act as a dipole in relation to the Hall sensor, wherein the Hall sensor comprises one or more sensor elements, the signals of which can be detected separately.

A further alternative consists in selecting an optical sensor arrangement.

In this respect, the sensor arrangement will preferably comprise a light source and a slot diaphragm, on the one hand, and a differential photodiode, on the other hand, wherein the light source and the slot diaphragm are held together on the force transducer and the differential photodiode is arranged on the stationary mounting member of the dynamometric cell.

Alternatively, the sensor arrangement may comprise a light source and a slot diaphragm, on the one hand, and a differential photodiode, on the other hand, wherein the light source and the slot diaphragm are arranged together on the stationary mounting member of the dynamometric cell and the differential photodiode is held on the force transducer.

These and further advantages of the invention will be explained in greater detail in the following on the basis of the drawings.

DETAILED DESCRIPTION OF THE INVENTION

Figure 1A:
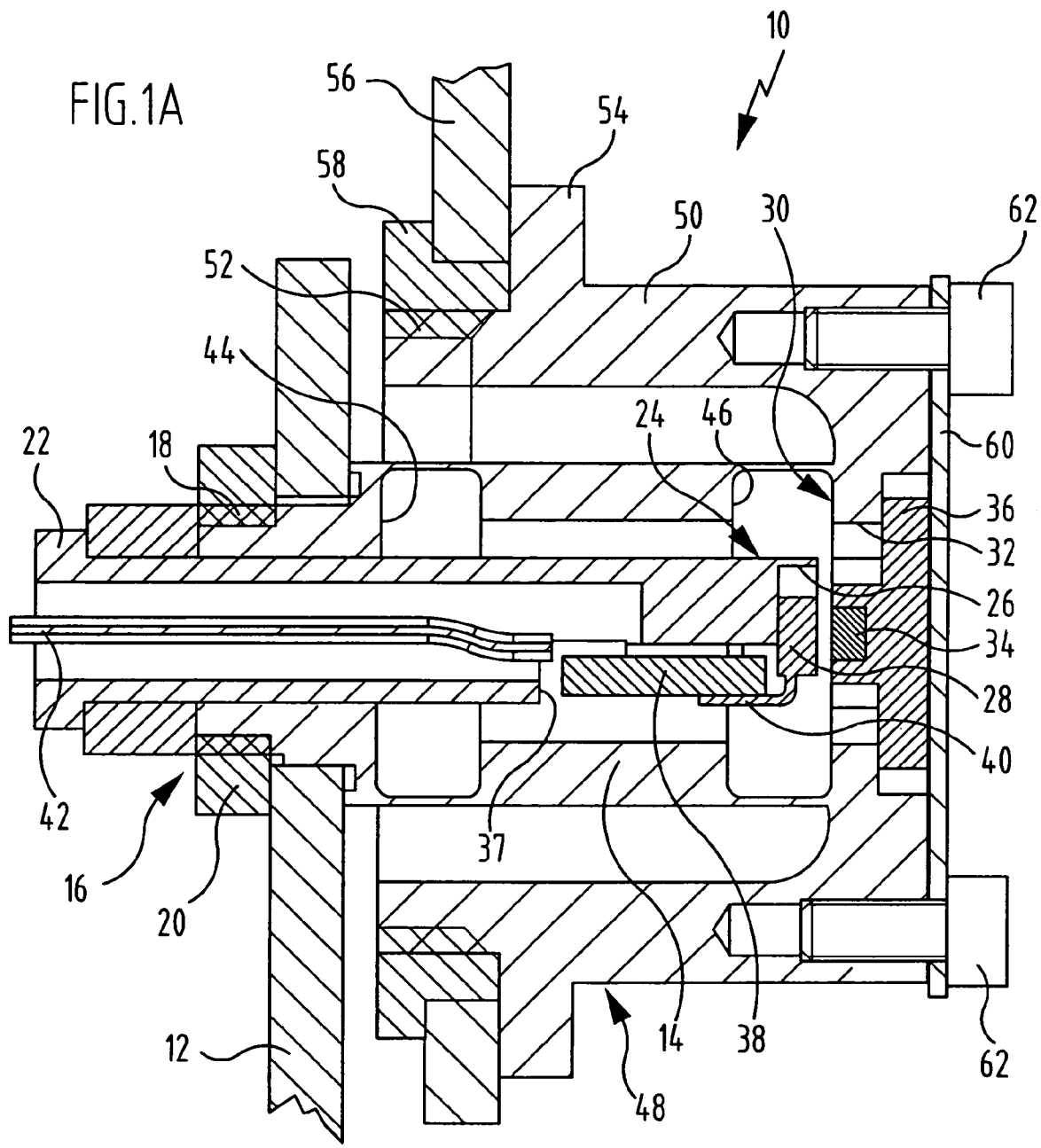
FIG. 1A: shows a sectional view through a dynamometric cell according to the invention.

FIG. 1A shows a dynamometric cell which is given altogether the reference numeral 10 and is held by plate 12 secured to a frame. When the dynamometric cell 10 according to the invention is used in a motor vehicle seat, the plate 12 which is secured to a frame can, for example, be the upper rail of the vehicle seat support.

The dynamometric cell 10 is constructed from an elastically deformable force transducer 14 which is equipped at a first end located to the left in the drawing with a mounting member 16 which engages through an opening in the plate secured to the frame with a threaded section 18, via which the force transducer 14 can be secured to the plate 12 secured to the frame with a counternut 20.

The force transducer 14 is of a hollow cylindrical design and open on the side of the mounting section 16 so that a flexurally rigid retaining element 22 can be inserted coaxially in the hollow space of the force transducer 14. The retaining element 22 itself is also preferably of a hollow cylindrical design, as illustrated, and has at its free end 24 a recess 26, in which a Hall sensor 28 can be mounted in a predetermined position. The Hall sensor 28 lies parallel to a base surface 30 of the force transducer 14, in which a central opening 32 is provided which serves to accommodate a permanent magnet 34. The permanent magnet 34 is preferably held by a cover element 36 and aligned in relation to the Hall sensor 28. As is apparent in FIG. 1A, the cover element 36 is preferably held at the free end of the force introduction member 50 via a clamping bridge 60 and fixed with several clamping bolts 62.

The retaining element 22, which supports the Hall sensor 28 at its free end, has adjacent thereto an additional recess 37, in which a circuit 38 can be accommodated which is connected directly to the Hall sensor 28 via lines 40. The circuit 38 serves the purpose of processing the sensor signal of the Hall sensor 28 directly on site and transmits signals insensitive to interference to the outside via the connection lines 42. The connection lines 42 also contain at the same time the energy supply for the circuit 38.

As shown in FIG. 1A, the force transducer 14 is provided with an annular recess 44 formed in its interior and an annular recess 46 spaced therefrom in longitudinal direction, these two recesses (each forming an attenuation zone) respectively leading to a weakening of the wall of the hollow cylindrical force transducer 14 and, as a result, forming hinge joints which confer on the force transducer the function of a parallelogram force transducer.

On account of the annular configuration of the recesses 44 and 46, multidimensional movements of the force transducer are possible on account of forces introduced, i.e., the force transducer can react to forces which act from different directions and these can be evaluated accordingly with a corresponding configuration of the combination pair of sensor 28 and permanent magnet 34.

At its free end, the force transducer 14 supports a force introduction member 48 which is of a pot-shaped design, wherein the base surface of the force introduction member 48 is, in this case, in one piece with the base 30 of the force transducer 14. The edge projecting from the base surface 30 in the form of a cylindrical wall 50 of the force introduction member 48 extends essentially over the entire free length of the force transducer 14 and, therefore, protects it essentially completely from mechanical influences. In addition, the cylindrical wall 50 acts as an electromagnetic screen for the sensor arrangement.

At its free end, the cylindrical wall 50 bears an annular flange 54 as well as an annular flange which adjoins it and on which a plate 56, for example, the upper rocker of a seat height adjustment of a vehicle seat, can be screwed onto threads 52 with the aid of a counternut 58 for the purpose of introducing forces.

It is understood that the assembly of the dynamometric cell according to the invention can also be carried out inversely, i.e., the force introduction member 48 will be connected securely to the frame (plate 12) while the mounting member 16 will be connected to the plate 56 (for example, the upper rocker of a vehicle seat).

Figure 1B:
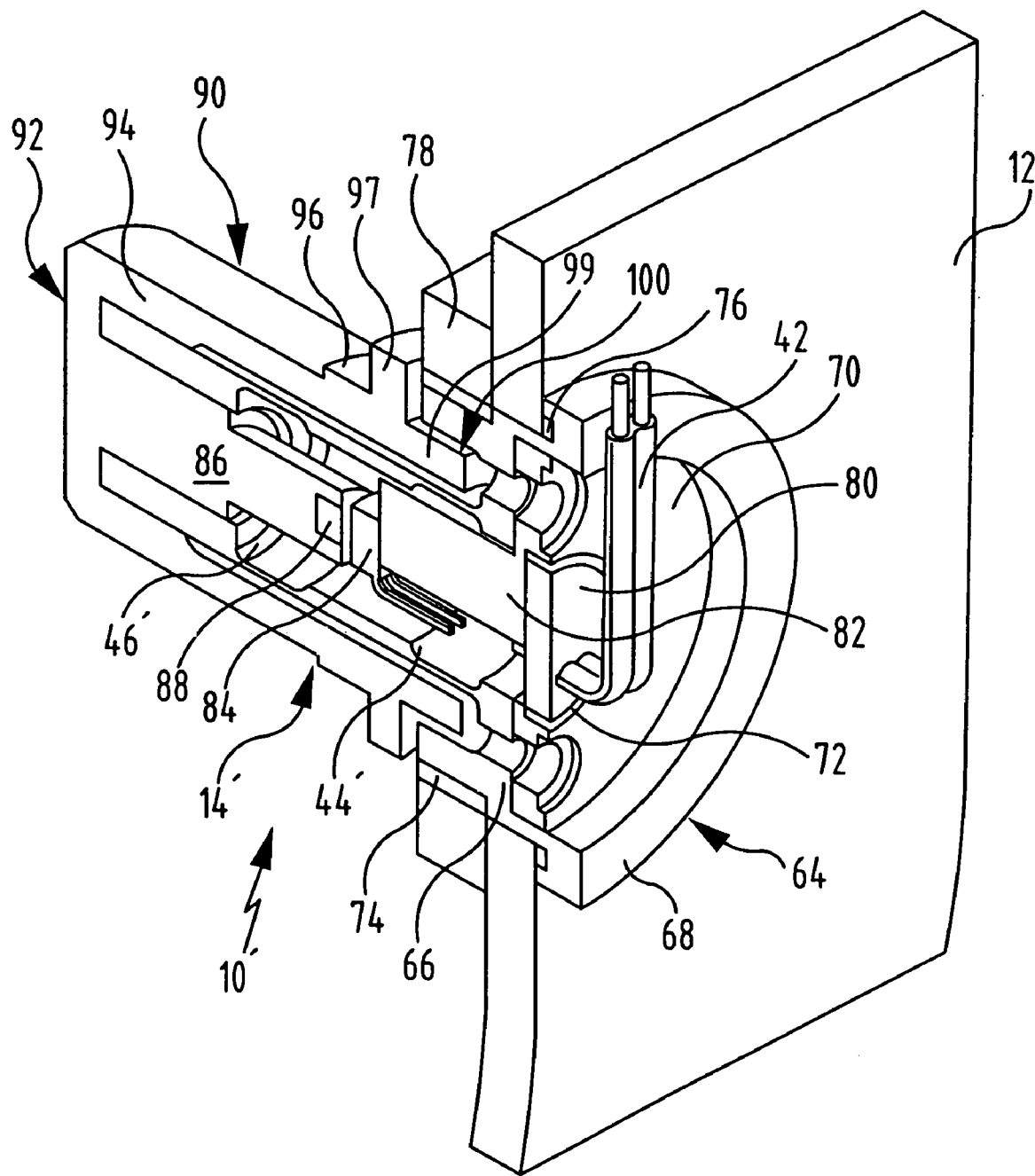
FIG. 1B: shows a sectional view through a variation of the dynamometric cell of FIG. 1A according to the invention.

FIG. 1B shows a similar embodiment to that in FIG. 1A in a perspective sectional illustration, wherein the same parts are given the same reference numerals.

In contrast to the embodiment of FIG. 1A, the force transducer 14' has a mounting member 64 which comprises a cylindrical wall 66 with a collar 68 which projects outwards and extends all the way around at the end facing away from the force transducer 14'. In the interior of the cylindrical wall 66, the mounting member 64 has an annular flange 70 which projects inwards and via which the mounting member 64 is then connected to the force transducer 14'.

The central opening 72 defined by the annular flange 70 projecting inwards is aligned with the hollow cylindrical interior of the force transducer 14'.

During assembly, the mounting member 64 is pushed through an opening in the plate 12 secured to the frame and abuts areally on this plate on one side with the collar 68. In order to achieve a seal between the collar 68 and the plate 12, the collar 68 can, as shown in FIG. 1B, have an annular groove 76 which is arranged immediately adjacent to the cylindrical wall 66 and into which a sealing ring or other sealing means can be inserted.

On the opposite side of the plate 12, a counternut 78 is then screwed onto the external thread 74 and, therefore, the mounting member 64 is secured to the plate 12. The interior of the force transducer 14' is still accessible via the opening 72 and this opening is preferably closed by a cover 80 which has ducts for the connection lines 42.

On its inwardly located side, the cover 80 has a retaining element 82 which is shown in FIG. 1B as a bolt. A Hall sensor 84 is arranged at the end of the bolt-shaped retaining element 82 and this is finally connected to the connection lines 42 via an electronic circuit. The electronic circuit has been omitted, in this case, for the sake of simplicity and is not shown. In principle, the arrangement in the case of the embodiment of FIG. 1B does not, however, differ essentially from that of FIG. 1A.

However, in this case the position of the Hall sensor, which is arranged essentially between the two annular recesses on the inner wall of the force transducer 14', is different to the configuration of FIG. 1A. Accordingly, the permanent magnet 88 is borne on a bolt 86 projecting into the interior of the force transducer 14' from the side of the base member of the force transducer 14' and so it is again arranged so as to be adjusted in a plane parallel to and spaced from the Hall sensor element 84. The force transducer 14' is connected at the end located opposite to the part connected to the mounting member 64 to a force introduction member 90 which is illustrated in this case as being in one piece with the force transducer 14' but can just as easily be connected, for example, via screw bolts to the free end of the force transducer 14', i.e., to the part of the force transducer 14' projecting from the plate 12.

As shown in FIG. 1B, the force transducer 14' is provided with an annular recess 44' formed in its interior and an annular recess 46' spaced therefrom in a longitudinal direction, these two recesses each forming an attenuation zone.

The force introduction member 90 is, as already shown in FIG. 1A, of a pot-shaped design with a base 92 and a cylindrical wall 94 which extends from the base 92 back over the length of the force transducer 14'.

At the end of the cylindrical wall 94 facing away from the base 92, this bears a step 96 projecting outwards and adjoining this an annular flange 97 which projects outwards. The step 96 serves for the shrinking on of a plate (not illustrated in FIG. 1B) which introduces the force to the force introduction member and can be arranged essentially parallel to the plate 12 which is ensured by an areal abutment on the annular flange 97.

The cylindrical wall 94 does, however, preferably extend still further in the direction towards the plate 12 and engages with its upper edge 99 in a space within the cylindrical wall 66 of the mounting member 64. As a result of the selection of the thicknesses of the cylindrical walls 66, on the one hand, and 94 or of the upper edge 99, on the other hand, a gap 100 may be determined which defines the maximum movement of the cylindrical wall 94 of the force introduction member in relation to the mounting member 64. As a result, the upper edge 99 in cooperation with the cylindrical wall 66 of the mounting member 64 represents a mechanical overload safeguard since it prevents forces which act excessively on the dynamometric cell 10' leading to any inadmissible deformation of the force transducer 14' since, in this case, an areal abutment of the upper edge 99 on the cylindrical wall 66 of the mounting member 64 would take place first of all which prevents any further movement and further deformation of the force transducer 14'.

A mechanical overload safeguard results on all sides on account of the symmetrical geometry of upper edge 99 and cylindrical wall 66 and so the functioning of the force transducer 14' is ensured irrespective of the direction, from which the forces are introduced to the dynamometric cell 10', and it remains operable.

The safety function as last described by way of a mechanical stop can, of course, be realized independently of how the positions of the Hall sensor and of the associated permanent magnet are arranged within the force transducer 14. This means that the arrangement in the case of FIG. 1B can also be configured in a similar manner to that of FIG. 1A, i.e., adjacent to the free end of the force transducer 14', at which this is connected to the force introduction member 90.

Figure 2:
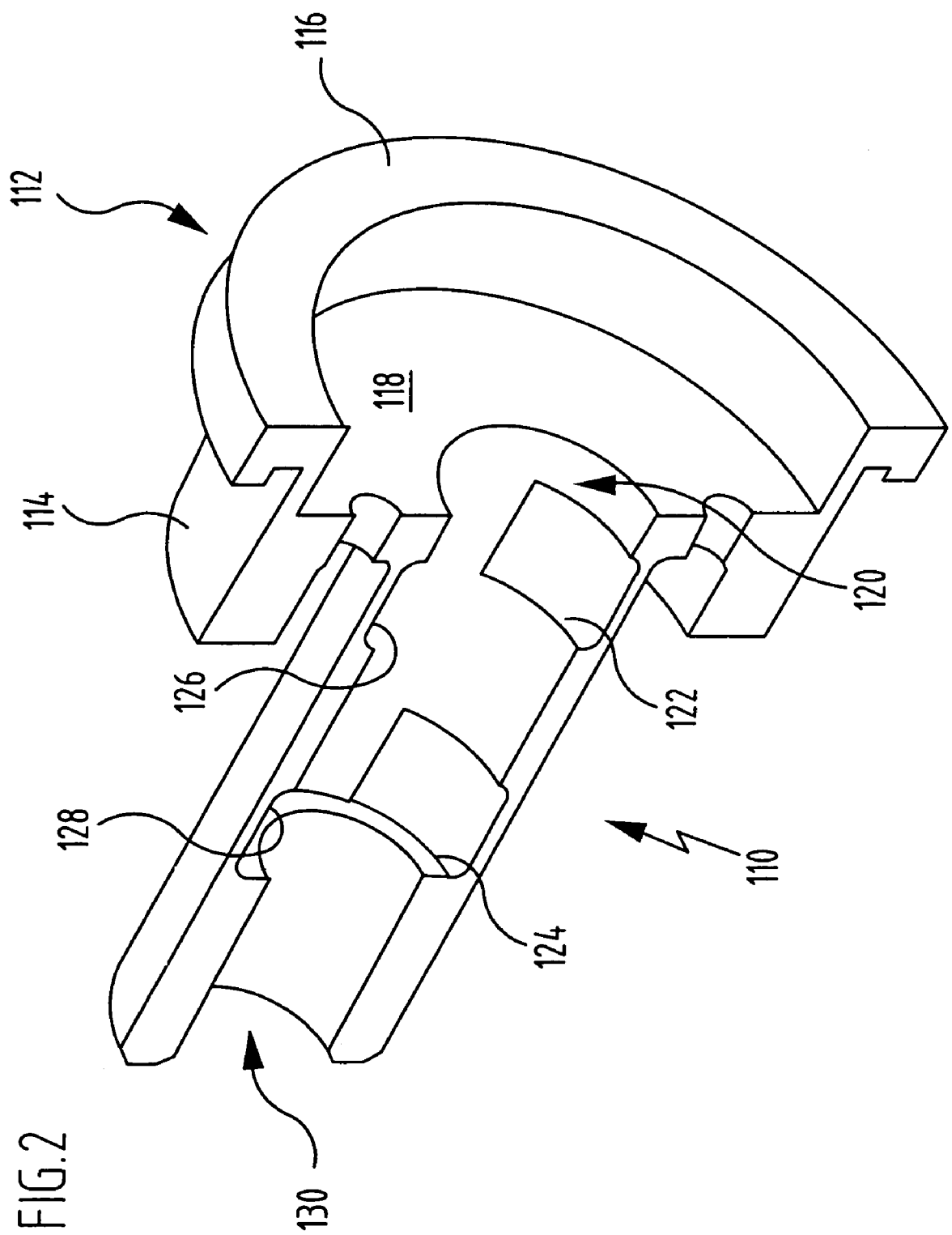
FIG. 2: shows a sectional view through a further variation of a dynamometric cell according to the invention.

FIG. 2 shows a force transducer 110 which is of a similar construction to the force transducer 14' of FIG. 1B and which is designed in one piece with a mounting member 112 at its end which is to be held so as to be secured to the frame. The mounting member 112 comprises an essentially cylindrical wall 114 which bears at its end facing away from the force transducer 110 a collar 116 which projects outwards and has the same function as the collar 68 of the embodiment of FIG. 1B.

In the interior of the cylindrical wall 114, an annular flange 118 is provided which projects inwards and via which the mounting member 112 is connected to the force transducer 114.

The annular flange 118 leaves an opening 120 free which is aligned with the interior of the force transducer 110 of a hollow cylindrical design.

The force transducer 110 has on its inner surface recesses 122 and 124 which are designed like annular segments, which are arranged in longitudinal direction of the force transducer 110 so as to be spaced from one another and which form the hinge points of the force transducer 110 and define this as a parallelogram guide.

In this embodiment, the number of directions, in which forces can act on the force transducer 110, is limited in contrast to the embodiment shown in FIG. 1B to the angular area which is covered by the two recesses 122 and 124. Recesses 126, 128 are provided opposite the recesses 122 and 124 and these define the necessary hinge points together with the recesses 122, 124. At the free end 130 of the force transducer 110 this can be closed with the aid of a pot-shaped force introduction member, corresponding to the force introduction member 90 of the embodiment in FIG. 1B, which can also support a bolt, on which the permanent magnet for the sensor arrangement can be held.

The Hall element can, again, be introduced in the interior of the force transducer 110 from the side of the opening 120 via a flexurally rigid bolt in order to be able to track the plastic deformation of the force transducer 110 from the point of view of signaling technology.

Figure 3:
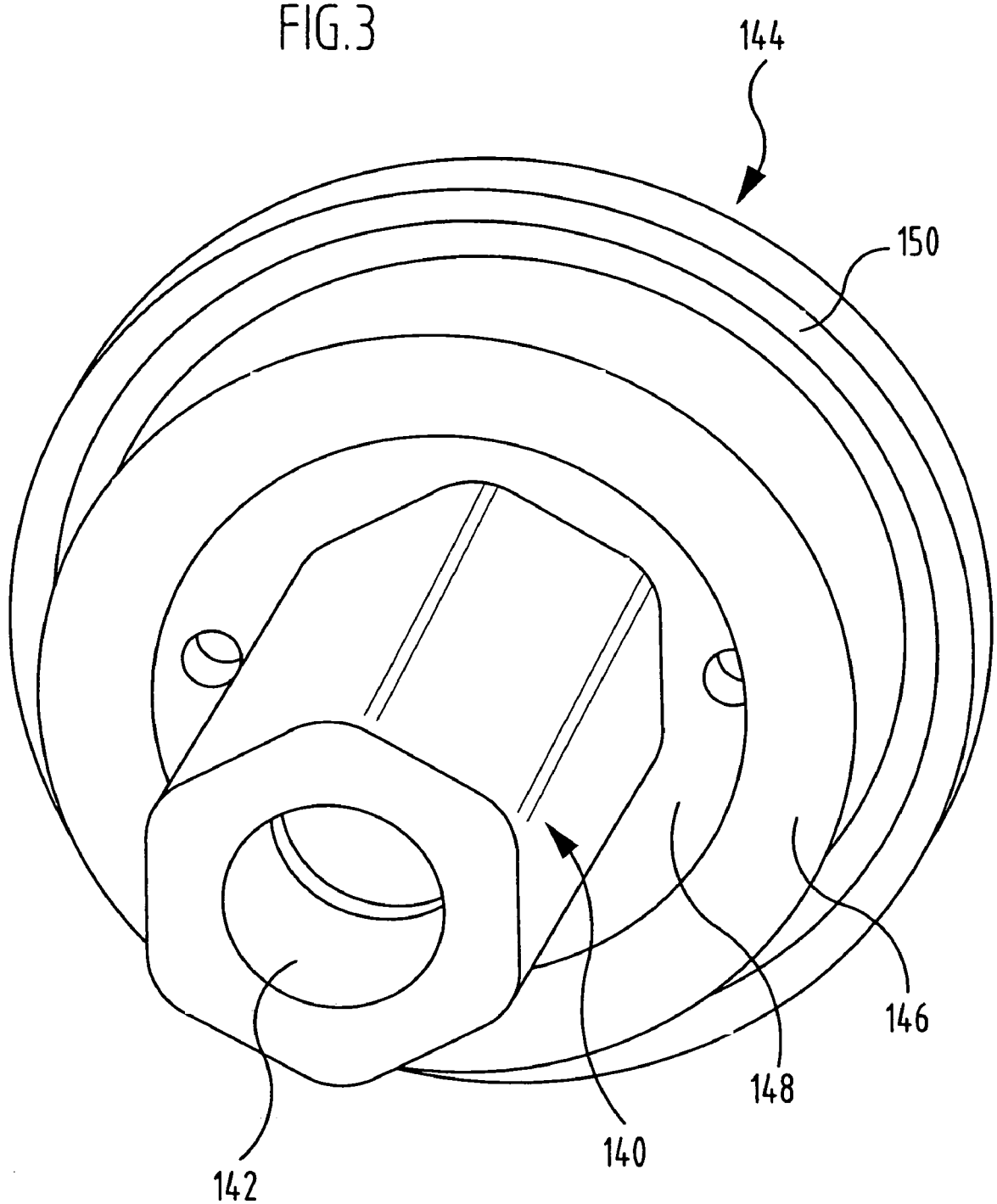
FIG. 3: shows a perspective view of a dynamometric cell according to the invention.

Whereas in the case of the embodiments of FIGS. 1A, 1B and 2 the cross section of the hollow cylindrical force transducers 14, 14' and 110 is exactly cylindrical, the contour of the force transducer 140 shown in FIG. 3 deviates from this.

In this case, a polygonal structure is selected which represents an alternative to the circular cylindrical structure of FIGS. 1A, 1B and 2.

In this case, as well, the free end of the force transducer 140 is of an open design (opening 142) and is closed in the completely mounted state of an associated dynamometric cell by a base member of a force introduction member (both not shown). At the secured end of the force transducer 140 this is connected to a mounting member 144 which has a cylindrical wall 146 which has a greater internal diameter than the external diameter of the force transducer 140 and partially engages over it in longitudinal direction.

An annular flange 148, via which the mounting member 144 is connected to the force transducer 140, projects in the interior from the cylindrical wall 146.

The mounting member 144 has, on the other hand, at its end located opposite the force transducer 140 a collar 150 which projects outwards and which, during the assembly of the mounting member in a receiving plate corresponding to the plate 12 of FIGS. 1A and 1B, comes to rest flush on it. The cylindrical wall 146 engaging inwards through the receiving plate is shown only schematically in this case and is lacking in the details shown in FIG. 1B which is, however, irrelevant with respect to understanding this case.

On account of the geometry of the wall of the hollow cylindrical force transducer 140 which is of a different design, other characteristics result in the evaluation of the elastic deformation of the force transducer 140 which may be taken into consideration during the course of the electronic processing of the signals of the Hall sensor (not shown in this case).

Figure 4:
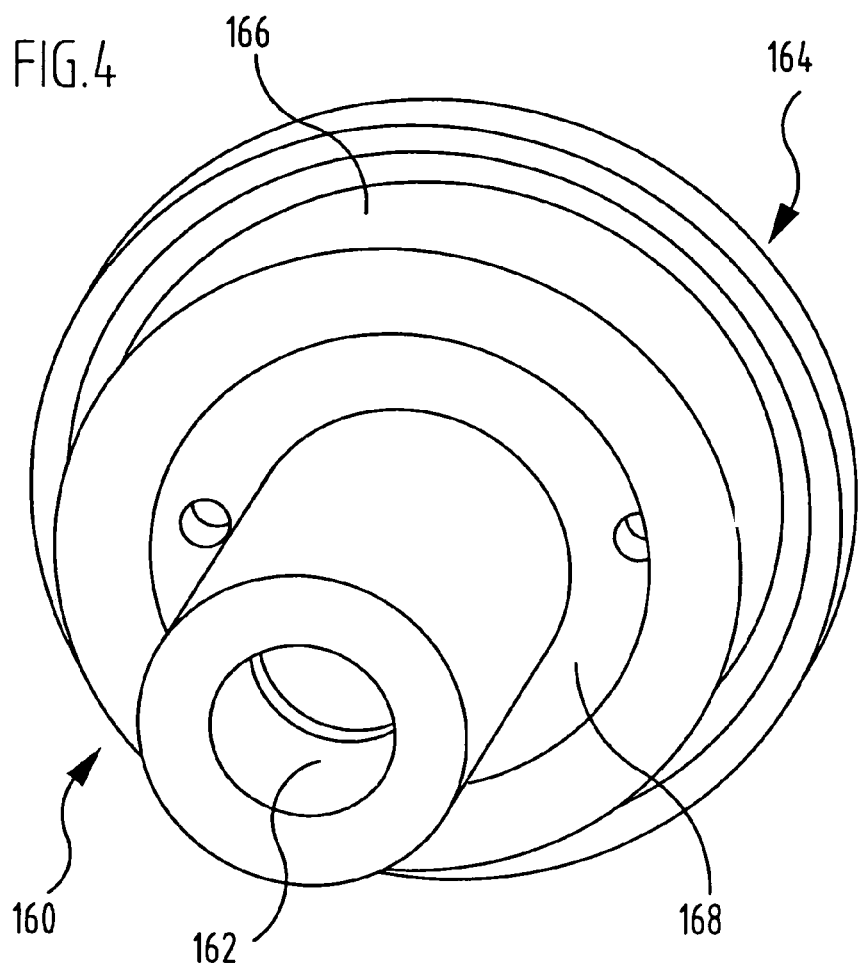
FIG. 4: shows a perspective view of a further variation of a dynamometric cell according to the invention.
Figure 5:
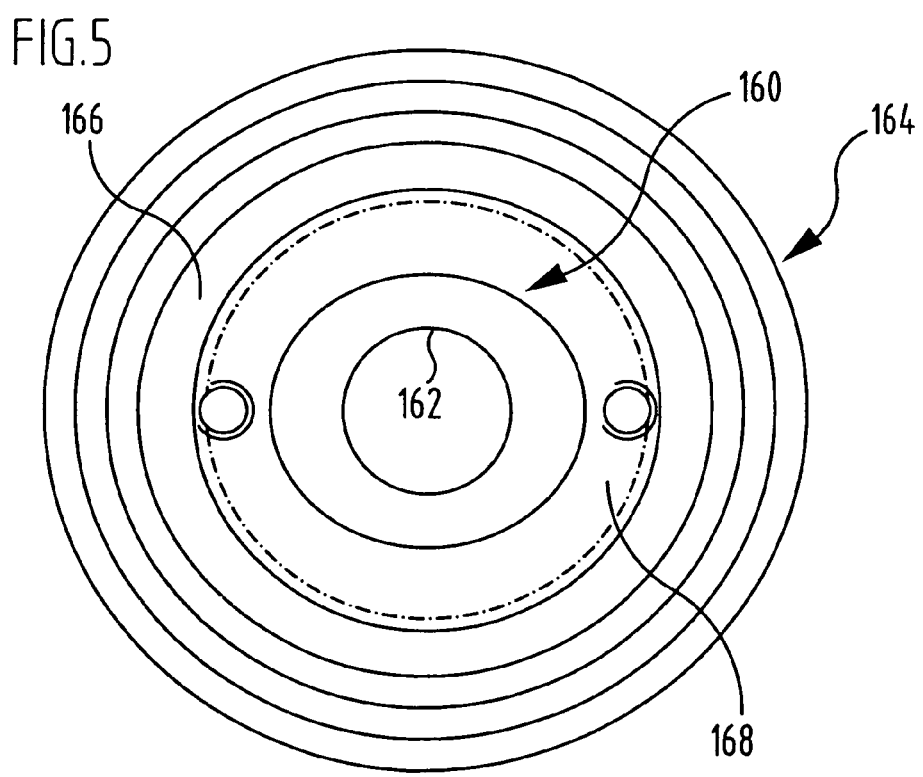
FIG. 5: shows a plan view of the dynamometric cell of FIG. 4.

A further, alternative embodiment of a force transducer which can be used in accordance with the invention in a dynamometric cell according to the invention is shown in FIGS. 4 and 5.

In this case, a force transducer 160 is provided which has an oval cross section in the outer contour.

In this case, as well, the free end of the force transducer 160 has an opening 162 which is closed by a base of a force introduction member (not illustrated) in the assembled state of the dynamometric cell according to the invention and including the force transducer 160.

At its end mounted so as to be secured to the frame, the force transducer 160 is connected to a mounting member 164 which has a cylindrical wall 166 which is aligned coaxially to the force transducer 160. The cylindrical wall 166 is connected to the end of the force transducer 160 to be secured via an annular flange 168 which projects inwards and leaves an opening free which is aligned with the hollow cylindrical interior of the force transducer 160.

The type of assembly and the manner in which the sensor arrangement is provided is no different in the embodiment which is shown in FIGS. 4 and 5 to that of FIGS. 2 and 3 and so reference may be made to the comments on these examples.

Figure 6:
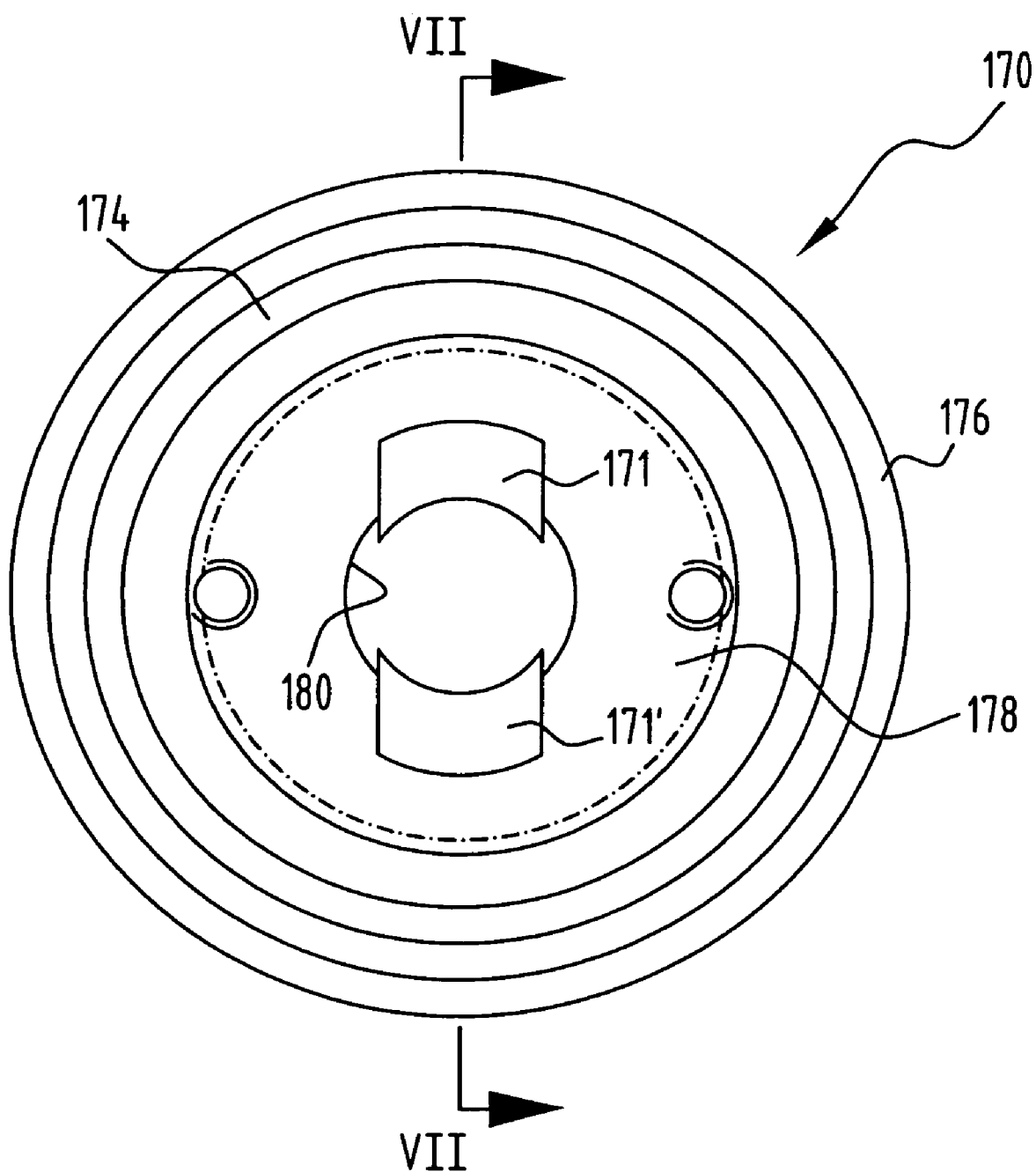
FIG. 6: shows a plan view of a further variation of a dynamometric cell according to the invention.
Figure 7:
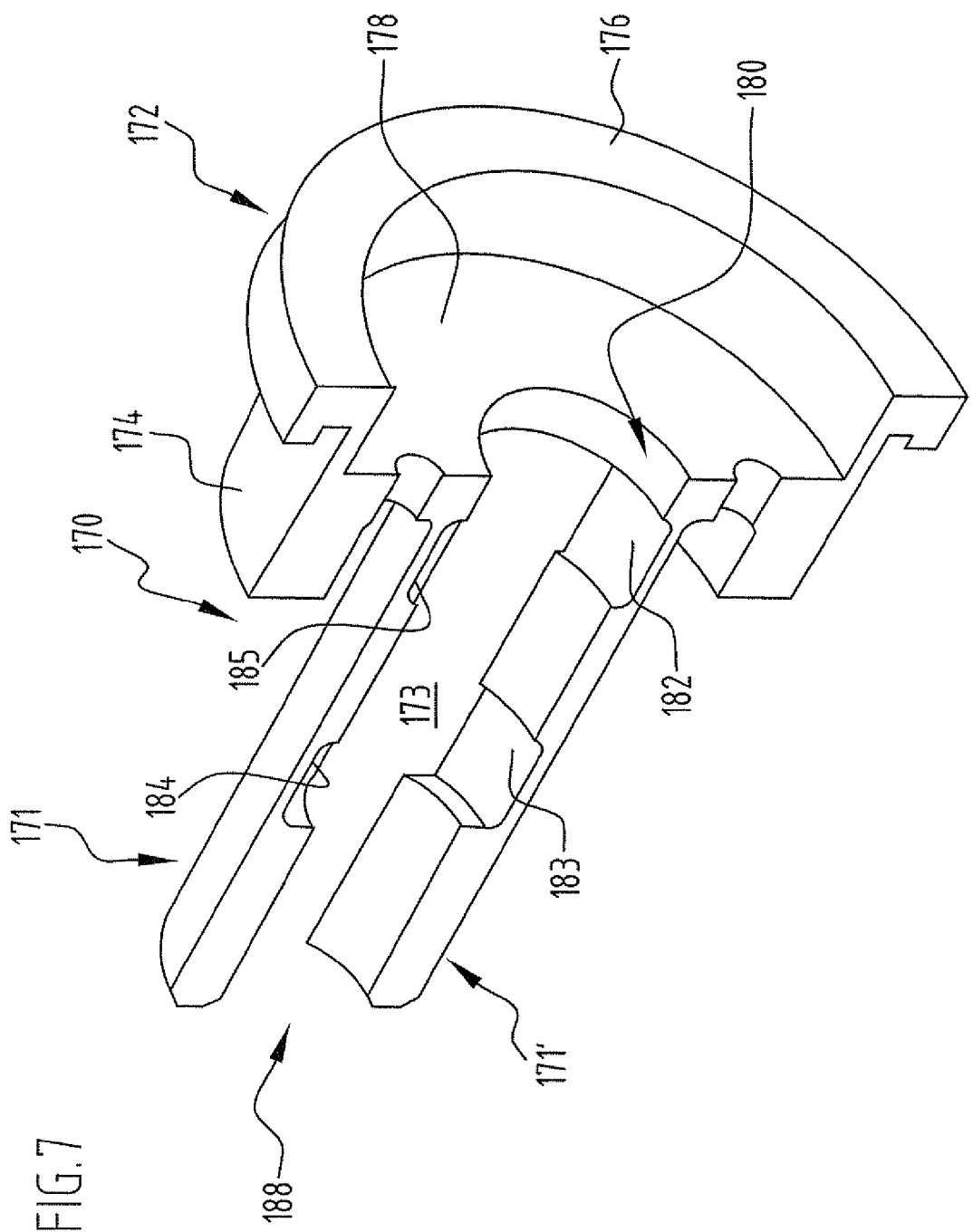
FIG. 7: shows a sectional view through the dynamometric cell of FIG. 6 along line VII-VII.

FIGS. 6 and 7 show a further, alternative embodiment of the invention in the form of a force transducer 170 which is constructed to a certain extent in a similar way to the force transducers 14' and 110 of FIG. 1B and FIG. 2, respectively.

In contrast to the force transducers 14' and 110, the force transducer 170 has a section adjacent to its free end which is not designed as a closed hollow profile, in contrast to the force transducers 14' and 110, but rather has passages 173 in two segments of a hollow profile located radially opposite one another. The hollow bar is preferably manufactured such that first of all a closed hollow profile is used, with which the lateral parts are then removed by machining so that the two wall segments 171, 171' located radially opposite one another then remain.

The force transducer 170 is connected at its end, which is to be held so as to be secured to the frame, to a mounting member 172 which is preferably designed in one piece with the force transducer 170. The mounting member 172 comprises an annular flange 178 which projects radially, borders on the force transducer 170 and from which a cylindrical wall 174 extends in axial direction of the force transducer 170 and spaced parallel to it. At the outer circumference of the annular flange and in opposite direction to the direction, in which the cylindrical wall 174 extends, the annular flange has an annular collar 176 integrally formed on it, which corresponds with respect to its function to the collar 68 of the dynamometric cell of FIG. 1B.

The annular flange 178 leaves an opening 180 free which is essentially aligned with the interior of the force transducer 170.

Recesses 182, 183 and 184, 185 which form hinge points of the force transducer 170 are formed on the wall segments 171 and 171' of the force transducer 170 and spaced in axial direction. The wall segments 171, 171' are kept at a distance at their free ends in that an end piece is welded thereto in a similar manner to that shown in FIG. 1B and this supports a retaining bar which points into the interior of the force transducer 170 and to which a permanent magnet is, for example, fixed, as illustrated in FIG. 1B.

The end piece, which connects the two wall segments 171 and 171' to one another at their free ends and keeps them at a distance, forms at the same time a part of the force introduction member for the force transducer 170.

A Hall element may be introduced in the interior of the force transducer 170 from the side of the opening 180 via a flexurally rigid bolt in order to track the elastic deformation of the force transducer 170 from the point of view of signaling technology. On account of an elastic deformation of the wall segments 171, 171', a relative movement of the permanent magnet in relation to the Hall sensor is caused during an introduction of force to the force introduction member (corresponds to the free end 188 of the wall segments 171, 171') and this leads to a change in the signal of the circuit.

The embodiment of FIGS. 6 and 7 has the advantage in comparison with the embodiments described above that a reduced sensitivity exists in relation to the torque acting on the force introduction member. This means that torques which attack the force introduction member have an effect which is less of an interference or none at all or does not falsify the measurement of weight forces introduced which has to be carried out. As a result, the accuracy of the force transducer is increased.

On account of the reduction in the closed hollow profile to the wall segments 171, 171', the mechanical stability of the force transducer 170 is, of course, decreased in comparison with the closed hollow profile. This may, however, be counteracted by an increase in the thickness of the segments 171, 171' and so the measurement range which can be covered with this advantageous variation of the force transducer according to the invention is the same as that, for example, of the force transducer of FIG. 2. This means that no limitations need be accepted with respect to the maximum admissible weight force to be measured in comparison with the other embodiments presented above and having a complete or closed hollow profile as hollow bar.

Figure 8:
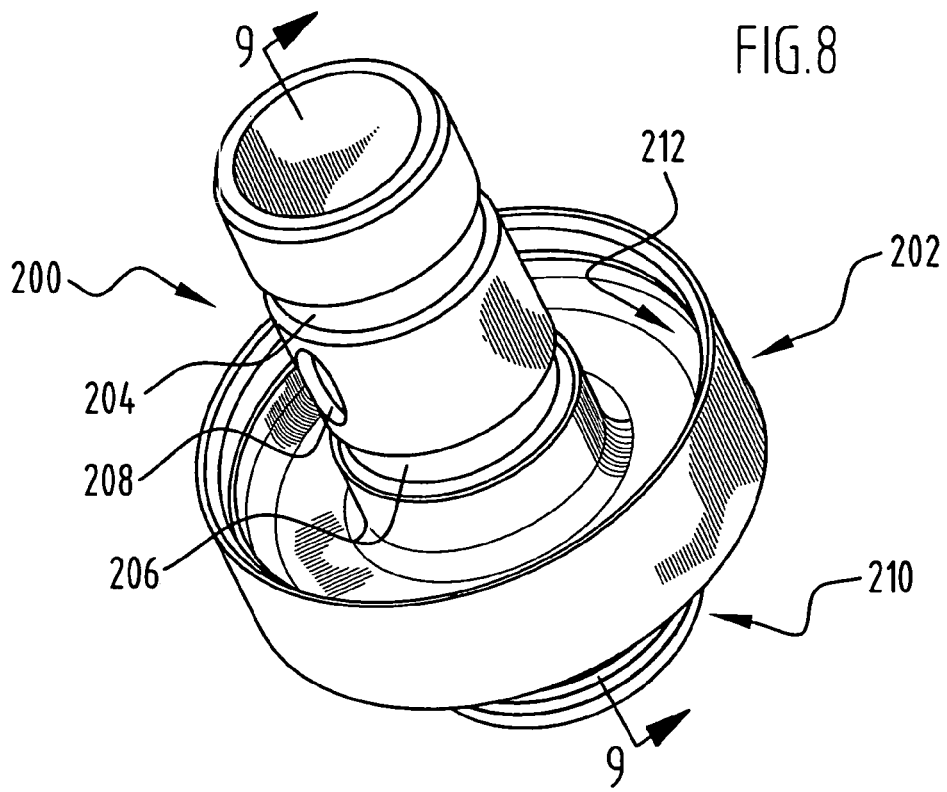
FIG. 8: shows a perspective illustration of a further variation of a force transducer according to the invention.

FIG. 8 shows in a perspective illustration an additional, preferred embodiment of a force transducer 200 according to the invention which is formed in one piece with a mounting member 202.

The force transducer 200 is designed as a hollow bar which has two attenuation zones 204, 206 spaced from one another in longitudinal direction.

Whereas in the case of the embodiments described above the attenuation zones are formed in the interior of the hollow bar, they are formed in the outer circumference in the example of the force transducer 200. The functioning of the force transducer is not altered as a result.

A transverse bore 208 is provided centrally between the two attenuation zones 204, 206 transversely to the longitudinal direction of the hollow bar and this transverse bore causes, in a similar way to the passages of the embodiment of FIGS. 6 and 7, a considerable reduction in the sensitivity of the dynamometric cell with respect to the torque acting on the force introduction member.

The transverse bore 208 passing through the hollow bar of the force transducer 200 twice is often sufficient for this purpose and this affects the stability of the hollow bar to a considerably lesser extent in comparison with the passages of the embodiment shown in FIGS. 6 and 7.

The mounting member 202 supports the hollow bar of the force transducer 200 on one side and on the opposite side a mounting block 210, with which the entire dynamometric cell can be built into, for example, screwed to a holding device (not shown), for example, on the vehicle seat or the seat rail.

Furthermore, the mounting member 202 has an annular receiving means 212, in which one end of a force introduction member can be accommodated.

Figure 9:
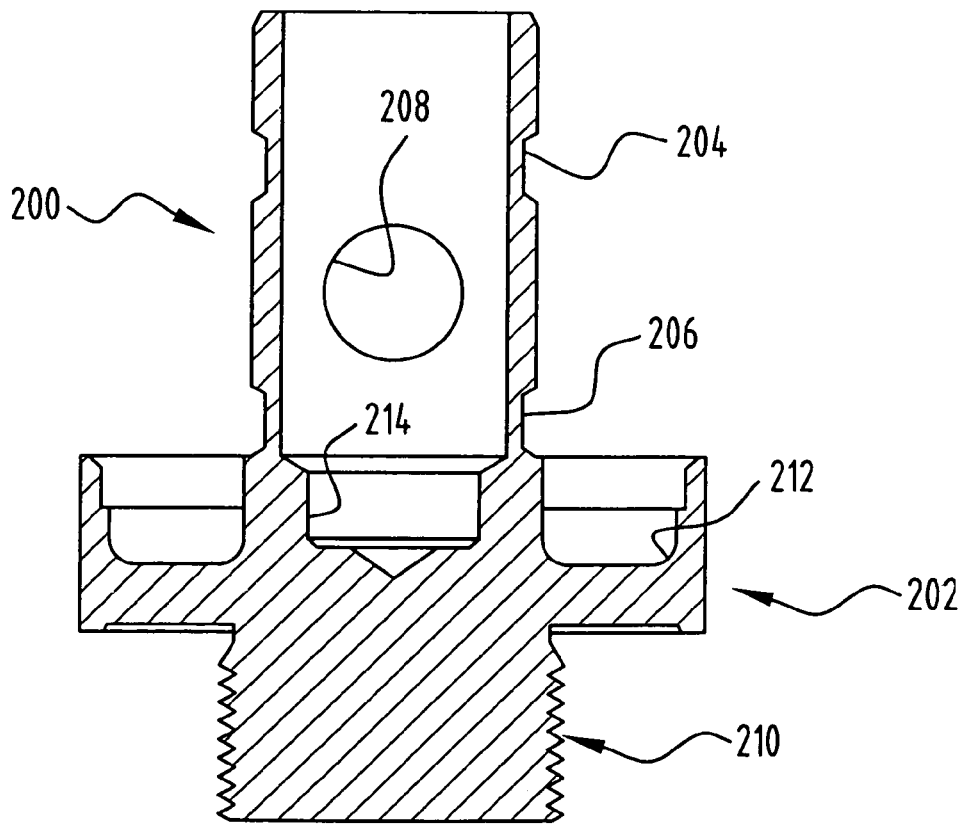
FIG. 9: shows a sectional illustration through the force transducer of FIG. 8.

Furthermore, the mounting member has on the side of the hollow bar 200 a central bore 214 (cf. FIG. 9) which serves to accommodate a retaining member, to which part of a sensor arrangement can be fixed.

Figure 10:
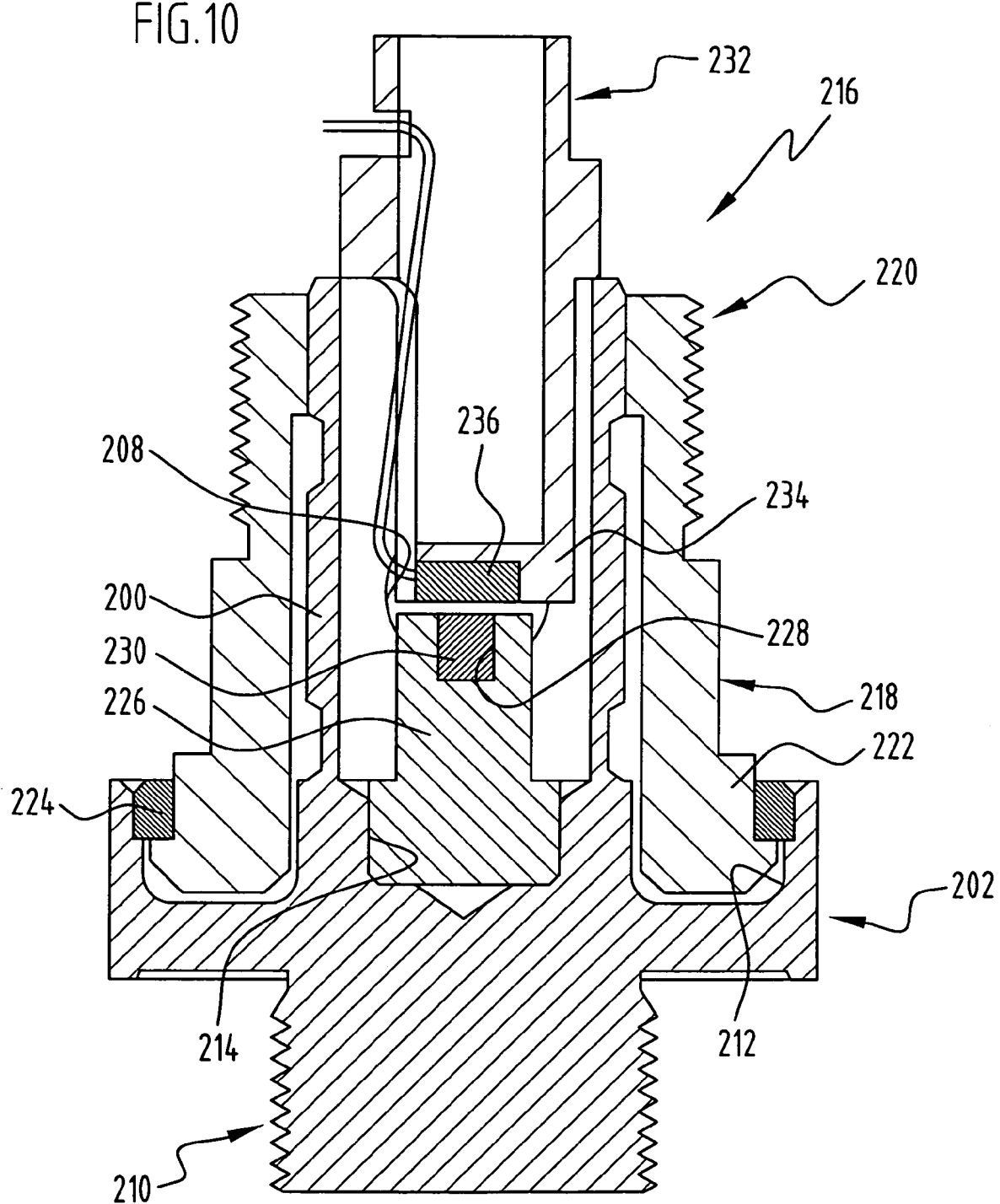
FIG. 10: shows a sectional illustration through a dynamometric cell according to the invention which includes the force transducer of FIG. 8.

Finally, FIG. 10 shows a dynamometric cell 216 which is constructed on the basis of the force transducer 200 and has a hollow cylindrical force introduction member 218 which is arranged coaxially to the hollow bar 200 of the force transducer. With a first end 220, the force introduction member 218 grips the free (second) end of the force transducer 200 and with a second end 222 the force introduction member 218 engages in the annular receiving means 212 of the mounting member 202.

The second end 222 of the force introduction member 218 is accommodated in the annular receiving means 212 of the mounting member 202 with a certain clearance, wherein the spacings apparent from FIG. 10 are, of course, not to scale and are drawn relatively large only for the sake of clarity.

The clearance serves the purpose of an essentially unhindered movement of the force introduction member 218 for as long as admissible forces are acting on it. As soon as these forces acting on it become inadmissibly large, a stop ring 224 prevents any further movement of the force introduction member 218 and thus prevents any damage to the hollow bar 200 of the force transducer.

The stop ring 224 can be interlocked on the mounting member 202 very simply via complementary projections and recesses (not shown in detail).

In the interior of the hollow bar 200, a retaining member in the form of a pin 226 is inserted into the central bore 214 of the mounting member 202 and comprises at its free end a magnet 230 fitted into a recess 228.

Finally, a hollow cylindrical retaining element 232 is secured at the free end of the hollow bar 200 and holds a Hall sensor 236, aligned with the magnet 230, at its end 234 projecting into the interior of the hollow bar 200.

The invention claimed is:

1. A dynamometric cell with an elastically deformable force transducer for receiving a weight force and a sensor arrangement for detecting the deformation of the force transducer and its conversion into an electric weight signal, wherein the force transducer is connected to a mounting member at a first end and supports a force introduction member at its second end, wherein the force transducer is designed as a hollow bar, wherein the force introduction member is of a hollow cylindrical design and is connected at one end to the second end of the force transducer, wherein the force introduction member essentially encloses the force transducer over its entire length and wherein the force introduction member is mounted with its other end on the mounting member so as to be movable.

2. The dynamometric cell as defined in claim 1, wherein the hollow bar has a polygonal cross section.

3. The dynamometric cell as defined in claim 1, wherein the hollow bar has a circular or oval cross section.

4. The dynamometric cell as defined in claim 1, wherein the force introduction member is held on the mounting member with a stop limiting the movement of the force introduction member.

5. The dynamometric cell as defined in claim 1, wherein a retaining element is arranged on the mounting member coaxially to the hollow bar, said retaining element extending into said bar and sewing to hold the sensor arrangement or a part thereof.

6. The dynamometric cell as defined in claim 5, wherein the retaining element comprises a recess for guiding electric signal cables of the sensor arrangement.

7. The dynamometric cell as defined in claim 5, wherein the retaining element comprises a recess for accommodating a sensor element.

8. The dynamometric cell as defined in claim 1, wherein the dynamometric cell comprises an integrated, mechanical overload protection.

9. The dynamometric cell as defined in claim 8, wherein the mechanical overload protection comprises a stop limiting the elastic deformation movement of the force transducer.

10. The dynamometric cell as defined in claim 9, wherein the stop is formed on a retaining element and limits a deformation movement of the force transducer itself.

11. The dynamometric cell as defined in claim 9, wherein the stop is formed on the mounting member and on the force introduction member and limits the deformation movement of the force transducer indirectly.

12. The dynamometric cell as defined in claim 9, wherein the stop is formed on the force introduction member and on the force transducer.

13. The dynamometric cell as defined in claim 1, wherein the sensor arrangement comprises one or more wire strain gauges.

14. The dynamometric cell as defined in claim 1, wherein the sensor arrangement comprises a sensor arrangement for a contact-free distance measurement.

15. The dynamometric cell as defined in claim 1, wherein the sensor arrangement is a sensor arrangement operating inductively.

16. The dynamometric cell as defined in claim 15, wherein the sensor arrangement comprises a Hall sensor and a magnet.

17. The dynamometric cell as defined in claim 16, wherein the magnet is a permanent magnet.

18. The dynamometric cell as defined in claim 16, wherein the magnet is arranged on the force introduction member and the Hall sensor on a retaining element.

19. The dynamometric cell as defined in claim 16, wherein the magnet is arranged on a retaining element and the Hall sensor on the force introduction member.

20. The dynamometric cell as defined in claim 16, wherein the Hall sensor and the magnet of the sensor arrangement are designed and arranged such that in the no-load state of the dynamometric cell the Hall sensor generates an electric signal with a value smaller than a third of the value of the maximum effective signal.

21. The dynamometric cell as defined in claim 20, wherein the magnet is designed to act as a monopole in relation to the Hall sensor and wherein the Hall sensor comprises an even number of sensor elements arranged in the form of a two-dimensional matrix located opposite the monopole, wherein two of the sensor elements form a respective part of an electronic differential circuit.

22. The dynamometric cell as defined in claim 20, wherein the magnet is designed to act as a dipole in relation to the Hall sensor and wherein the Hall sensor comprises one or more sensor elements, the signals of said sensor elements being detectable separately.

23. The dynamometric cell as defined in claim 16, wherein the magnet is arranged on a pin and the Hall sensor is arranged on a retaining element.

24. The dynamometric cell as defined in claim 16, wherein the magnet and the Hall sensor are arranged within the force introduction member.

25. The dynamometric cell as defined in claim 1, wherein the sensor arrangement comprises an optical sensor element.

26. The dynamometric cell as defined in claim 25, wherein the sensor comprises a light source and a slot diaphragm, and a differential photodiode, wherein the light source and the slot diaphragm are held together on the force transducer and the differential photodiode is arranged on the stationary mounting member of the dynamometric cell.

27. The dynamometric cell as defined in claim 25, wherein the sensor comprises a light source and a slot diaphragm, and a differential photodiode, wherein the light source and the slot diaphragm are arranged together on the stationary mounting member of the dynamometric cell and the differential photodiode is held on the force transducer.

28. The dynamometric cell as defined in claim 1, wherein the force transducer has two attenuation zones spaced in longitudinal direction of the bar.

29. The dynamometric cell as defined in claim 28, wherein the attenuation zones are designed such that the force transducer is able to carry out elastic deformation movements in more than one plane when acted upon by weight forces to be determined.

30. The dynamometric cell as defined in claim 28, wherein the attenuation zones comprise a section of the hollow bar having a reduced wall thickness.

31. The dynamometric cell as defined in claim 28, wherein the attenuation zones are formed in a circumferential direction of the hollow bar in circular segments located radially opposite one another.

32. The dynamometric cell as defined in claim 28, wherein the hollow bar has passages in two segments located radially opposite one another, said passages extending at least from the one attenuation zone as far as the other attenuation zone.

33. The dynamometric cell as defined in claim 32, wherein the passages extend essentially as far as the second end of the hollow bar supporting the force introduction member.

* * * * *